United States Patent [19]
Brown et al.

[11] 3,919,364
[45] Nov. 11, 1975

[54] PROCESS FOR PREPARING PHOSPHORUS NITRILATE POLYMERS

[75] Inventors: Michael Alwyn Brown, Stenungsund; Gert Harald Leopold Jangestrand, Uddevalla, both of Sweden

[73] Assignee: Mo Och Domsjo Aktiebolag, Ornskoldsvik, Sweden

[22] Filed: July 2, 1973

[21] Appl. No.: 375,429

[30] Foreign Application Priority Data
July 17, 1972 Sweden.............................. 9402/72

[52] U.S. Cl.............................. 260/973; 260/927 N
[51] Int. Cl.$^2$......................................... C07F 9/02
[58] Field of Search...................... 260/927 N, 973

[56] References Cited
UNITED STATES PATENTS
3,505,087  4/1970  Godfrey.................. 260/927 N UX OTHER PUBLICATIONS
Wagner et al., "Synthetic Organic Chemistry," J. Wiley & Sons, New York (1953), p. 110.

*Primary Examiner*—Anton H. Sutto

[57] ABSTRACT

A process is provided for preparing phosphorus nitrilate polymers by reaction of a phosphorus nitrile halide, and a hydrogen halide or a hydroxyl compound, in the presence of an alkylene oxide as an acid acceptor.

20 Claims, No Drawings

PROCESS FOR PREPARING PHOSPHORUS NITRILATE POLYMERS

Phosphorus nitrilate polymers are widely used as fireretardant additives for cellulosic materials, such as regenerated cellulose, paper and paper products, particularly rayon fibers. The process that is used for the preparation of these compounds is described by Fitzsimmons and Shaw: Alkoxy- and Aryloxyphosphazenes; *Chemistry and Industry* 1961 109. The reaction can be carried out using Phosphorus nitrile halides by reaction either with an alcohol in the presence of a base to accept the hydrogen halide formed as a by product in the course of the reaction, or with an alkali metal alcoholate, in which case a base acceptor is not used. In either process halide salts of the metal or base are obtained which have to be separated from the reaction mixture, for example, by precipitation in an organic solvent followed by filtration. If an organic base is used instead of a metal, such as pyridine, it is also necessary for economic reasons to recover the organic base. Moreover, the starting materials in the case of the alkali metal alcoholates are expensive and difficult to prepare.

In accordance with the invention, phosphorus nitrilate polymers are prepared by the reaction of a phosphorus nitrile halide and a hydroxyl compound or a hydrogen halide, in the presence of an alkylene oxide as an acid acceptor. The reaction proceeds in accordance with the following scheme:

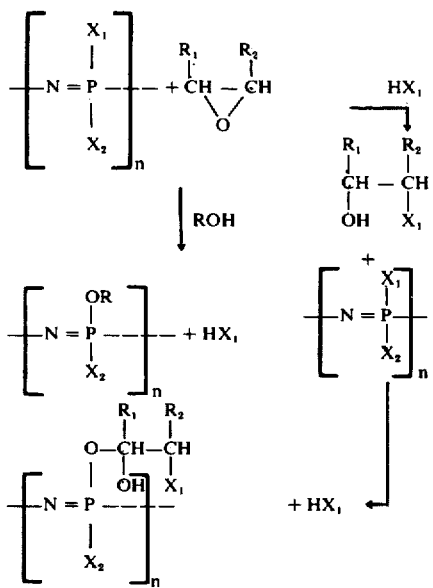

In the above scheme:
$X_1$ is bromine or chlorine;
$X_2$ is bromine or chlorine or OR;
R is a hydrocarbon group (such as alkyl, alkenyl, aralkyl, aryl or cycloalkyl) having from one to about twelve carbon atoms, preferably from about two to about six carbon atoms, and optionally containing one or more bromine or chlorine atoms, ether linkages or hydroxyl groups;
$R_1$ and $R_2$ are hydrogen, alkyl, aryl or alkyl aryl, the alkyl having from one to about twelve carbon atoms; and $n$ is an average number representing the number of units in the polymer, and is at least 3, with an upper limit of 15,000.

If $X_2$ is also bromine or chlorine, and two moles of alkylene oxide and hydrogen halide or hydroxyl compound are used, two OR or

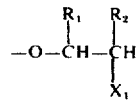

groups can be introduced into the molecule, to produce phosphorus nitrilate polymers of the type:

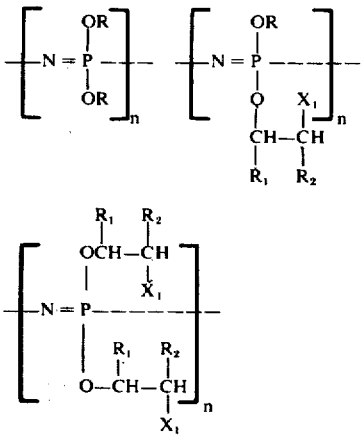

When a hydroxyl compound is used as the esterifying group, the reaction is believed to proceed by reaction of the phosphorus nitrile halide with the hydroxyl compound, to yield the corresponding phosphorus nitrilate and hydrogen halide. The hydrogen halide can then react with alkylene oxide to yield the corresponding halohydrin, which can easily be separated from the reaction mixture by distillation.

If the halohydrin formed by reaction of the alkylene oxide with hydrogen halide is reactive with the phosphorus nitrile halide, it can form an ester in which the halohydrin group becomes attached to phosphorus. Provided the reaction mixture contains free hydrogen halide at the outset, and the alkylene oxide group is the esterifying group, it is not necessary in this case to utilize a hydroxyl compound, since the halohydrin formed by reaction of the hydrogen halide with alkylene oxide serves as the hydroxyl compound. Consequently, the alkylene oxide is an essential component of the reaction mixture, as is the phosphorus nitrile halide, but the hydroxyl compound is an optional component, and can be replaced in whole or in part by halohydrin formed by reaction of hydrogen halide with the alkylene oxide.

The preferred starting material is a phosphorus nitrile dihalide in which the halogen is either bromine or chlorine, and the hydroxyl compound is an aliphatic or olefinic alcohol having from two to six carbon atoms and optionally substituted with bromine or chlorine.

The phosphorus nitrile halide used as a starting material can be a linear polymer, a cyclic trimer, tetramer or higher cyclic polymer, or mixtures thereof. The mixture of such materials is commercially available and is therefore preferred, but it is also possible to use any of the pure forms of phosphorus nitrile halides mentioned. It is also possible to use a phosphorus nitrile halide which has been partially esterified, so as to contain a proportion of OR groups, and subject this mixture to a further esterification in accordance with the process of the invention.

The hydroxyl compound can be any organic compound having a hydroxyl group which is reactive with a phosphoric halide to form a phosphoric ester of the compound and hydrogen halide.

Very satisfactory hydroxyl compounds are the aliphatic and cycloaliphatic alcohols having from one to about twelve carbon atoms, such as ethanol, n-propanol, isopropanol, n-butanol, isobutanol, n-pentanol, isopentanol, n-hexanol, isohexanol, n-octanol, 2-ethyl hexanol, isooctanol, cyclohexanol, cyclopentanol, cycloheptanol and cyclobutanol. halogen-substituted alcohols include chloroethanol, chloropropanol, chlorobutanol, 2,2,2-trichloroethanol, and 2,3-dibromopropanol.

The alcohol can include ether groups, such as diethylene glycol, the methyl ether of ethylene glycol, the ethyl ether of ethylene glycol, triethylene glycol, tetraethylene glycol, the ethyl ether of 1,2-propylene glycol, the ethyl ether of 1,4-butylene glycol, and the ethyl ether of triethylene glycol.

Polyhydric alcohols can also be used, such as ethylene glycol, propylene glycol, glycerol, erythritol, pentaerythritol, sorbitol and mannitol.

Phenols can also be used, including phenol, o,m- and p-cresol, carvacrol, thymol, the xylenols, catechol, veratrole, creosole, orcinol, resorcinol, hydroquinone, and their halogenated derivative, such as the mono chlorophenols, monochloro cresols, monochloroxylenols, dichlorophenol, tetrachlorophenol, pentachlorophenol and monochlororesorcinol.

Aromatic alcohols (alkyl aryl hydroxy compounds) which can be used include benzyl alcohol, benzhydrol, phenethyl alcohol, w-phenylpropyl alcohol, triphenyl carbinol and phenylmethyl carbinol.

Unsaturated alkenyl alcohols which can be used include allyl alcohol, crotyl alcohol, propargyl alcohol, allyl carbinol, methyl vinyl alcohol, penten-1-ol-5, dodecenol, citronellol, butenol, heptenol and nonenol.

Mixtures of two or more hydroxyl compounds can also be used (such as the alcohol and halohydrin shown in the reaction scheme) in which event the phosphorus nitrilate polymers will contain OR groups derived from each alcohol used, and will possess properties associated with each.

The properties of the polymer vary according to the length of the carbon chain of the OR substituent. The lower molecular weight R substituents impart higher water solubility and a lower retention to regenerated cellulose than the higher molecular weight R groups, while the higher molecular weight R groups reduce the phosphorus content of the polymer and therefore reduce the fire retardant effect. If mixtures of both long and short chain hydrocarbon R groups are introduced into the polymer, the hydrophobicity of the polymer can be maintained while the phosphorus content is kept relatively low. To obtain this mixed effect OR groups containing from one to two carbon atoms and from three to twelve carbon atoms can be present together in the phosphorus nitrilate polymer.

As the alkylene oxide, any alkylene oxide capable of reacting with hydrogen halide and thus serving as a hydrogene halide acceptor can be used. The alkylene oxide can have from two to about twelve carbon atoms. The lower molecular weight alkylene oxides containing from two to about six carbon atoms are frequently preferred. Ethylene oxide, 1,2-propylene oxide, 1,2-butylene oxide, 3,-4 butylene oxide, eipchlorohydrin, glycidol and epithylin are exemplary. Higher molecular weight alkylene oxides include styrene oxide and methyl styrene oxide. Usually the lower molecular weight alkylene oxides are preferred, because they are less expensive.

In an especially preferred embodiment of the process of the invention, the phosphorus nitrile halide is reacted with the halohydrin (bromo or chloro alcohol) obtained by reaction of the alkylene oxide and the hydrogen chloride or hydrogen bromide liberated in the reaction. In this case, the alkylene oxide added as a halogen acceptor can also be used as the esterification agent, which considerably simplifies the reaction and renders it less expensive. Therefore, if desired, alkylene oxide and an amount of hydrogen chloride suited to form the corresponding halohydrin can be added to the phosphorus nitrile halide. It is also possible to initiate the reaction to add the halohydrin itself or another hydroxyl compound at the beginning of the reaction. Once hydrogen halide is formed, the halohydrin will be formed in situ, and the reaction can be continued with alkylene oxide.

In this preferred embodiment of the invention, the lower alkylene oxides that yield primary alcohols, especially ethylene oxide, are preferred, since these react more rapidly than alkylene oxides yielding secondary alcohols. Thus, phosphorus nitrile halide can for example be reacted with 2-chloroethanol produced by reaction of ethylene oxide and hydrogen chloride, chloroethoxy groups being introduced into the phosphorus nitrile halide. Optionally, a partial first esterification can be effected with a secondary alcohol, and a second terminating esterification with a primary alcohol derived from the alkylene oxide.

The reaction is carried out by charging the phosphorus nitrile halide, optionally dissolved in a suitable organic solvent, together with the desired amount of hydroxyl compound or hydrogen halide (for reaction with subsequently added alkylene oxide). Then, the alkylene oxide is added, either continuously or in increments during the reaction, which is carried out at a reaction temperature within the range from about 20° to about 150°C, preferably within the range from about 60° to about 130°C. At the conclusion of the reaction, the temperature is preferably brought to within the range from about 100° to about 130°C, for a short time at least.

The reaction pressure is not critical, and can range from atmospheric pressure to superatmospheric pressure, to for example, 10 atmospheres, preferably from about 2 to about 5 atmospheres.

The amount of hydroxyl compound and alkylene oxide added can be varied but is at least stoichiometric, and therefore is at least 1 mole per mole of halogen atoms to be substituted. A large excess can be used, however, up to 5 moles, but preferably not exceeding 1.5 moles, for reasons of economy, since if an excess is used, it must be recovered and recycled. If the halohydrin derived from the alkylene oxide in the course of the reaction esterifies the phosphorus nitrile halide, the amount of hydroxyl compound can be reduced by an equivalent amount, or eliminated altogether.

The reaction time is in no way critical, but varies according to the starting materials used, the desired degree of conversion, the reaction temperature, and the reaction pressure. In general, the reaction is complete within from about 2 to about 24 hours.

Upon completion of the reaction, the product is isolated by distilling off the excess of reactants and by-products formed, since these are more volatile than the reaction product. If desired, the polymeric reaction product can be further purified by one or more washes with water, the first wash water suitably being alkaline, in order to extract any acidic residues present. The by-products obtained in the course of the distillation (which is preferably carried out under reduced pressure or vacuum) and essentially consisting of halohydrin can be recycled to the reaction, if desired, or reconverted to alkylene oxide before recycling, or used in another esterification process.

The reaction can be carried out as a batch reaction, or continuously, in which event the reactants are blended and passed through a continuous-flow reaction system, after which the low boiling reagents and by-products are separated in a distillation column or tower.

The following Examples in the opinion of the inventors represent preferred embodiments of the invention:

EXAMPLE 1

464 grams (4 moles) of a mixture of phosphorus nitrile dichloride polymers was charged in an autoclave together with 1,300 grams (16 moles) of 2-chloroethanol. Upon evacuation of air present, the autoclave was heated gradually to 120°C, while 396 grams (9 moles) ethylene oxide was added stepwise. After the reaction had proceeded for 12 hours, the excess of 2-chloroethanol and ethylene oxide was removed by distillation at reduced pressure, and the product was freed from acidic residues by washing with 5% sodium hydroxide solution, and then further washed with distilled water until neutral. The water remaining was removed by blowing with hot air. The end product, mixed di(2-chloroethoxy) phosphorus nitrilate polymers, 710 grams, representing a yield of 87%, was a yellow viscous liquid. Analysis showed 32.9% Cl, 6.7% N and 14.8% P.

EXAMPLE 2

464 grams (4 moles) of a mixture of phosphorus nitrile dichloride polymers was charged together with 1,440 grams (24 moles) of n-propanol to an autoclave. Upon evacuation of air present, the autoclave was heated gradually to 90°C, and was kept there at constant temperature for 5 hours, while 295 grams (5 moles) of propylene oxide was added, stepwise. Then the temperature was raised to 125°C, and the step-by-step addition of propylene oxide was continued until an additional 236 grams (4 moles) had been added. The reaction time at this temperature was 6 hours. The excess of n-propanol and propylene oxide as well as chloro propanol formed during the reaction was distilled off at reduced pressure, and the reaction product worked up as in Example 1. The end product, mixed dipropoxy phosphorus nitrilate polymers, 540 grams, was a yellow viscous liquid. The yield was 83%. Analysis showed 8.4% N and 18.4% P.

EXAMPLE 3

The process of Example 2 was repeated except that the n-propanol was replaced by 1,560 grams (12 moles) of 1-octanol, and the propylene oxide was replaced by 396 grams (9 moles) of ethylene oxide. Analysis of the brown viscous end product showed that the phosphorus nitrilate polymers contained both octoxy and 2-chloro ethoxy groups as substituents.

EXAMPLE 4

The process of Example 2 was repeated except that the n-propanol was replaced by 1,830 grams (24 moles) of 2-methoxyethanol. The end product, mixed di(2-methoxyethoxy) phosphorus nitrilate polymers, was obtained in a yield of 81%, and was a yellow-brown viscous liquid.

EXAMPLE 5

In the same way as in Example 2, mixed phosphorus nitrile dichloride polymers were reacted with allyl alcohol, 1,393 grams (24 moles). The end product, di(allyloxy) phosphorus nitrilate polymers, was obtained in a yield of 72%.

Having regard to the foregoing disclosure, the following is claimed as the inventive and patentable embodiments thereof:

1. A process for preparing phosphorus nitrilate polymers which comprises reacting a phosphorus nitrile halide and a hydroxyl compound having a hydroxyl group which is reactive with a phosphoric halide and selected from the group consisting of
   1. aliphatic and cycloaliphatic monohydric alkanols and halogen-substituted aliphatic alkanols having from one to about twelve carbon atoms;
   2. polyhydric alkanols having from two to six carbon atoms and from two to six hydroxyl groups and monomethyl and ethyl ethers thereof;
   3. polyoxyalkylene glycols having from two to four carbon atoms in the oxyalkylene groups and from two to four oxyalkylene groups; and mono methyl and ethyl ethers thereof;
   4. phenols having from one to two phenolic hydroxyl groups; alkyl phenols having from one to two phenolic hydroxyl groups and from one to two lower alkyl groups having from two to three carbon atoms;and halogen substituted such phenols and alkyl phenols having from one to five halogen atoms;
   5. phenalkyl alcohols having from one to three phenyl groups and from one to three carbon atoms in the alkyl groups;
   6. unsaturated alkenols having from three to twelve carbon atoms; and
   7. mixtures thereof; to form a phosphoric ester of the compound and hydrogen halide in the presence of an alkylene oxide having from two to twelve carbon atoms as a hydrogen halide acceptor which reacts with hydrogen halide to form a halohydrin at a temperature within the range from about 60° to about 130°C to form a reaction mixture comprising a phosphorus nitrilate polymer, and recovering the phosphorus nitrilate polymer from the reaction mixture.

2. A process in accordance with claim 1 in which the phosphorus nitrile halide has the formula

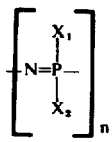

in which:

X₁ is bromine or chlorine;

X₂ is bromine or chlorine or OR wherein R is selected from the group consisting of hydrocarbon groups having from one to about twelve carbon atoms, and such hydrocarbon groups containing bromine or chlorine atoms, such groups containing ether linkages, and such groups containing hydroxyl groups; and n is an average number representing the number of units in the polymer, and is within the range from about 3 to about 15,000.

3. A process in accordance with claim 2 in which one mole of phosphorus nitrile halide is reacted with one mole of hydroxyl compound and the phosphorus nitrilate polymer has the formula:

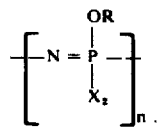

4. A process in accordance with calim 2 in which one mole of phosphorus nitrile halide is reacted with two moles of hydroxyl compound, and the phosphorus nitrilate polymer has a formula selected from the group consisting of:

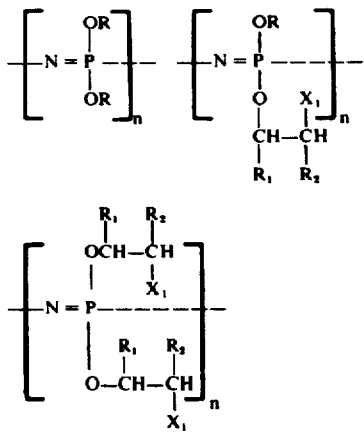

in which X₁ X₂ R and n are as in claim 2 and R₁ and R₂ are selected from the group consisting of hydrogen, alkyl, aryl and alkyl aryl, the alkyl having from one to about twelve carbon atoms.

5. A process in accordance with claim 2 in which OR is

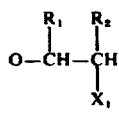

and R₁ and R₂ are selected from the group consisting of hydrogen, alkyl, aryl and alkyl aryl, the alkyl having from one to about twelve carbon atoms.

6. A process in accordance with claim 1 in which the reaction is carried out by charging the phosphorus nitrile halide, optionally dissolved in a suitable organic solvent, together with the desired amount of hydroxyl compound, the alkylene oxide is added, and at the conclusion of the reaction, the temperature is brought to within the range from about 100° to about 130°C.

7. A process in accordance with Claim 1 in which the reaction pressure is within the range from about one atmosphere to about 10 atmospheres.

8. A process in accordance with claim 1 in which the amount of hydroxyl compound and alkylene oxide added is at least 1 mole up to 5 moles per mole of halogen atoms to be substituted.

9. A process in accordance with claim 1 in which the reaction time is within the range from about 2 to about 24 hours.

10. A process in accordance with claim 1 in which the reaction product is isolated by distilling off the excess of reactants and by-products formed that are more volatile than the reaction product, and the polymeric reaction product further purified by at least one wash with water.

11. A process in accordance with claim 1 in which a hydrogen halide formed during the reaction and reacts with alkylene oxide to yield the corresponding halohydrin, which reacts with the phosphorus nitrile halide to form an ester in which the halohydrin group becomes attached to phosphorus.

12. A process in accordance with claim 1, in which a halohydrin is formed by reaction of hydrogen halide with alkylene oxide and both the hydroxyl compound and the halohydrin react with phosphorus nitrile halide to form a mixed phosphorus nitrilate polymer.

13. A process in accordance with claim 1 in which the hydroxyl compound is an alkanol having from two to six carbon atoms.

14. A process in accordance with claim 1 in which the phosphorus nitrile halide is a linear polymer, a cyclic trimer, tetramer or higher cyclic polymer, or a mixture thereof.

15. A process in accordance with calim 1 in which the hydroxyl compound is an aliphatic or cycloaliphatic alkanol having from one to about twelve carbon atoms.

16. A process in accordance with claim 15 in which the alkanol includes from one to three chlorine or bromine atoms.

17. A process in accordance with claim 1 in which the hydroxyl compound is a mono methyl or ethyl ether of a polyhydric alkanol.

18. A process in accordance with claim 1 in which the hydroxyl compound is a polyhydric alkanol having from two to six carbon atoms and from two to six hydroxyl groups.

19. A process in accordance with claim 1 in which the alkylene oxide has from two to (six) carbon atoms.

20. A process in accordance with claim 1 in which the alkylene oxide is ethylene oxide.

* * * * *

UNITED STATES PATENT OFFICE
CERTIFICATE OF CORRECTION

Patent No. 3,919,364          Dated November 11, 1975

Inventor(s) Michael Alwyn Brown et al.

It is certified that error appears in the above-identified patent and that said Letters Patent are hereby corrected as shown below:

[73] page 1          : "Och" should be --och--

Column 1, line 11    : "Phosphorus" should be --phosphorus--

Column 1, line 35    :

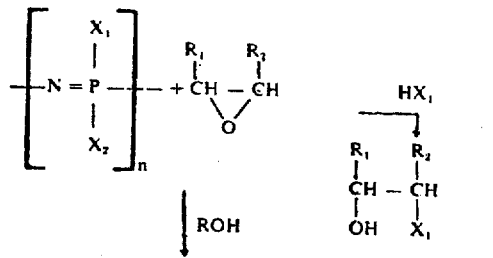

should be

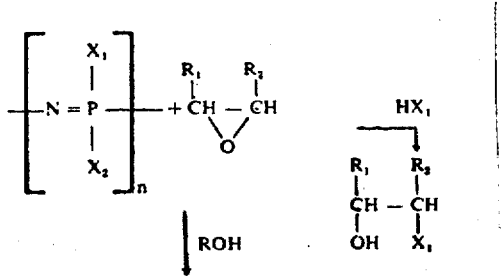

UNITED STATES PATENT OFFICE
CERTIFICATE OF CORRECTION

Patent No. 3,919,364  Dated November 11, 1975

Inventor(s) Michael Alwyn Brown et al.

It is certified that error appears in the above-identified patent and that said Letters Patent are hereby corrected as shown below:

Column 1, line 45 :  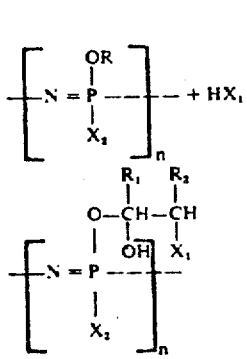  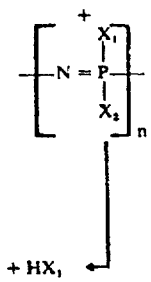
Column 1, line 52 :

should be

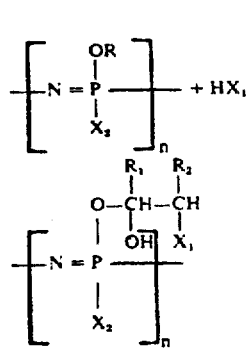  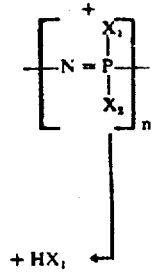

UNITED STATES PATENT OFFICE
CERTIFICATE OF CORRECTION

Patent No. 3,919,364        Dated November 11, 1975

Inventor(s) Michael Alwyn Brown et al

It is certified that error appears in the above-identified patent and that said Letters Patent are hereby corrected as shown below:

Column 2, lines 19 and 26 : 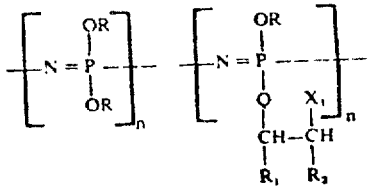

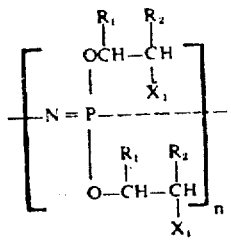

should be

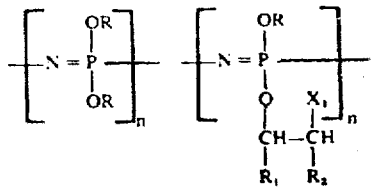

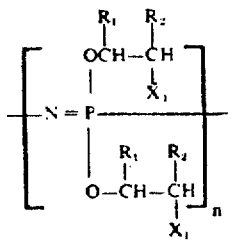

Column 3, line 15 : "halogen" should be --Halogen--

UNITED STATES PATENT OFFICE
CERTIFICATE OF CORRECTION

Patent No. 3,919,364    Dated November 11, 1975

Inventor(s) Michael Alwyn Brown et al

It is certified that error appears in the above-identified patent and that said Letters Patent are hereby corrected as shown below:

Column 3, line 37 : "w" should be --ω--

Column 3, line 66 : "hydrogene" should be --hydrogen--

Column 7, line 21 :

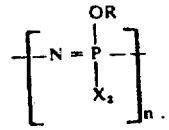

should be

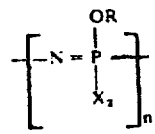

Column 7, line 25 : "calim" should be --claim--

Column 7, line 33 :

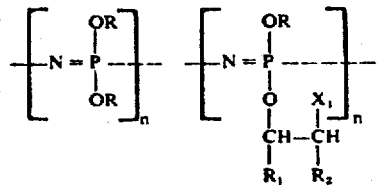

should be

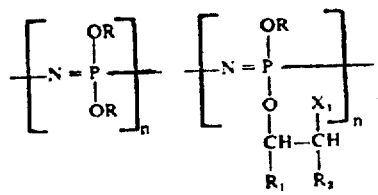

Page 5 of 5

UNITED STATES PATENT OFFICE
CERTIFICATE OF CORRECTION

Patent No. 3,919,364  Dated November 11, 1975

Inventor(s) Michael Alwyn Brown et al

It is certified that error appears in the above-identified patent and that said Letters Patent are hereby corrected as shown below:

Column 7, line 42 :

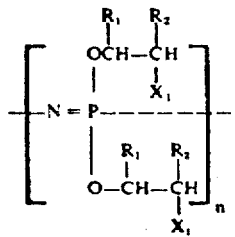

should be

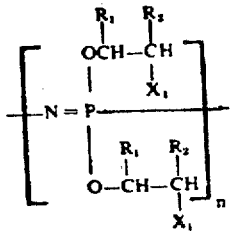

Signed and Sealed this twenty-second Day of June 1976

[SEAL]

Attest:

RUTH C. MASON
Attesting Officer

C. MARSHALL DANN
Commissioner of Patents and Trademarks